United States Patent
Cho et al.

(10) Patent No.: US 7,581,070 B2
(45) Date of Patent: Aug. 25, 2009

(54) MULTI-CHIP PACKAGE DEVICE HAVING ALTERNATELY-ENABLED MEMORY CHIPS

(75) Inventors: Hyun-Duk Cho, Suwon-si (KR); Tae-Gyun Kim, Seongnam-si (KR)

(73) Assignee: Samsung Electronics Co., Ltd., Suwon-si Gyeonggi-do (KR)

( * ) Notice: Subject to any disclaimer, the term of this patent is extended or adjusted under 35 U.S.C. 154(b) by 520 days.

(21) Appl. No.: 11/228,192

(22) Filed: Sep. 19, 2005

(65) Prior Publication Data

US 2006/0212693 A1 Sep. 21, 2006

(30) Foreign Application Priority Data

Mar. 21, 2005 (KR) .................... 10-2005-0023012

(51) Int. Cl.
*G06F 12/00* (2006.01)
*G06F 15/177* (2006.01)

(52) U.S. Cl. .................. 711/154; 711/103; 711/105; 713/2

(58) Field of Classification Search ......... 711/103–105, 711/154

See application file for complete search history.

(56) References Cited

U.S. PATENT DOCUMENTS

| 6,192,408 | B1 | 2/2001 | Vahalia et al. |
| 6,366,487 | B1 | 4/2002 | Yeom |
| 6,453,397 | B1 | 9/2002 | Okuda |
| 7,114,052 | B2 * | 9/2006 | Shoji .................. 711/202 |
| 2003/0028708 | A1 * | 2/2003 | Moran .................. 711/103 |

FOREIGN PATENT DOCUMENTS

| EP | 0 858 040 A2 | 8/1998 |
| JP | 6242964 | 9/1994 |
| JP | 2002024044 A | 1/2002 |
| JP | 2004318403 | 11/2004 |
| KR | 1020010070416 A | 7/2001 |

\* cited by examiner

*Primary Examiner*—Shane M Thomas
(74) *Attorney, Agent, or Firm*—Volentine & Whitt, PLLC

(57) ABSTRACT

A multi-chip package device includes first and second memory chips configured to share addresses and control signals. The first and second memory chips each include main memory, buffer memory, an option terminal for receiving an option voltage, an access signal generation block, and a controller. The main memory of the first memory chip stores boot code. The buffer memory of the first memory chip includes boot memory. The option voltages of the first and second memory chips have different voltage levels. The access signal generation block generates a buffer access signal that undergoes a one-way transition in response to the boot code address. The one-way transition of the buffer access signal of the first memory chip is a transition to activation, and the one-way transition of the buffer access signal of the second memory chip is a transition to inactivation.

12 Claims, 8 Drawing Sheets

MULTI-CHIP PACKAGE DEVICE HAVING ALTERNATELY-ENABLED MEMORY CHIPS

BACKGROUND OF THE INVENTION

1. Field of the Invention

The present invention relates generally to semiconductor devices and, more particularly, to a multi-chip package device to which a unified memory technology is applied. This application claims priority from Korean Patent Application No. 10-2005-0023012 filed on 21 Mar. 2005, the entirety of which is hereby incorporated herein for all purposes as if fully set forth herein.

2. Description of the Related Art

Recently, a multi-chip packaging technology that integrates two or more individual memory chips into a signal package device has been developed. In accordance with the multi-chip packaging technology, processors and memory chips, logic chips and memory chips, or memory chips alone are mounted in a single package. A multi-chip package device, in which two or more individual memory chips are mounted in a single package, is advantageous in that the manufacturing cost thereof can be reduced and the miniaturization thereof can be achieved.

A multi-chip package device in which two memory chips are mounted in a single package or housing is disclosed in U.S. Pat. No. 6,366,487 entitled "Plurality of Integrated Circuit Chips," which is incorporated herein by reference. In accordance with this patent, first and second memory chips included in a single package are configured to share external pins (for external addresses, external control signals and data). The first and second memory chips included in the single package are distinguished from each other by option voltages applied to an option pad. The first and second memory chips are each implemented in the form of unified memory that stores code and data in a single piece of memory. Furthermore, necessary code and data are temporarily stored in buffer memory and the buffer memory is accessed when necessary.

Meanwhile, in the multi-chip package device, a priority processing command can be issued. When such a priority processing command is issued, access to boot code, prior to accessing general data or code, is required to perform the priority processing command. Accordingly, the multi-chip package device also requires efficient storage of the boot code capable of executing the priority processing command, and a technology for efficiently accessing the boot code.

Accordingly, it would be desirable to provide a multi-chip package device having two or more memory chips to which a unified memory technology is applied, and a method of driving the multi-chip package device, which can not only efficiently store boot code capable of performing a priority processing command, but also efficiently access the boot code.

SUMMARY OF THE INVENTION

In accordance with one aspect of the present invention, a multi-chip package device, comprises: first and second memory chips configured to share addresses and control signals, wherein each of the first and second memory chips comprises: main memory for storing data, buffer memory for temporarily storing data written to and read from the main memory an option terminal for receiving an option voltage, an access signal generation block for generating a main access signal driving access to the main memory and a buffer access signal driving access to the buffer memory in response to the addresses and the control signals, the main access signal and the buffer access signal having logic states that are determined according to a level of the option voltage, the buffer access signal undergoing a one-way transition in response to a boot code address, and a controller for performing control to select the main memory and the buffer memory in response to the main access signal and the buffer access signal. The option voltages provided to the first and second memory chips have different voltage levels from each other. The main memory of the first memory chip stores boot code that includes a program capable of performing an operation in conformity with a certain priority processing command. The buffer memory of the first memory chip includes boot memory for temporarily storing the boot code, the boot memory being specified in response to a boot code address. The one-way transition of the buffer access signal of the first memory chip is a transition to an activation level, and the one-way transition of the buffer access signal of the second memory chip is a transition to an inactivation level.

In accordance with another aspect of the present invention, A multi-chip package device, comprising: first and second memory chips configured to share control signals and addresses, wherein each of the first and second memory chips comprises: main memory for storing data and boot code, including a program capable of performing an operation in conformity with a certain priority processing command, buffer memory for temporarily storing data, which are written to and read from the main memory, and the boot code, the buffer memory including boot memory that is specified in response to a boot code address, an option terminal for receiving option voltages, an access signal generation block for generating a main access signal driving access to the main memory and a buffer access signal driving access to the buffer memory in response to the addresses and the control signals, the main access signal and the buffer access signal having logic states that are determined according to levels of the option voltages, and a controller for performing control to select the main memory and the buffer memory in response to the main access signal and the buffer access signal, wherein the option voltages of the first and second memory chips have different voltage levels from each other.

In accordance with a further another aspect of the invention, a method of driving a multi-chip package device having first and second memory chips configured to share addresses and control signals, comprising the steps of: storing boot code, including a program capable of performing an operation in conformity with a priority processing command, in buffer memory of the first memory chip, the buffer memory of the first memory chip storing the accessed boot code in response to activation of a predetermined first buffer access signal; receiving the priority processing command in an activation state of a second buffer access signal that performs control to perform access to the buffer memory of the second memory chip; deactivating the second buffer access signal and activating the first buffer access signal in response to the priority processing command; and executing the boot code in response to the activation of the first buffer access signal.

In accordance with yet another aspect of the invention, A multi-chip package device, comprising: a semiconductor device package; a first memory chip mounted in the semiconductor device package, including, main memory for storing data and boot code that includes a program capable of performing an operation in conformity with a priority processing command, buffer memory for temporarily storing data written to and read from the main memory, the buffer memory including boot memory for temporarily storing the boot code, the boot memory being specified in response to a boot code address, an option terminal for receiving an option voltage, and means for enabling access to the boot memory in response to receiving the boot code address; and a second memory chip mounted in the semiconductor device package, including, main memory for storing data, buffer memory for temporarily storing data written to and read from the main memory, and an option terminal for receiving an option voltage, wherein the first and second memory chips are configured to share addresses and control signals, and wherein the option voltages provided to the first and second memory chips have different voltage levels from each other.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
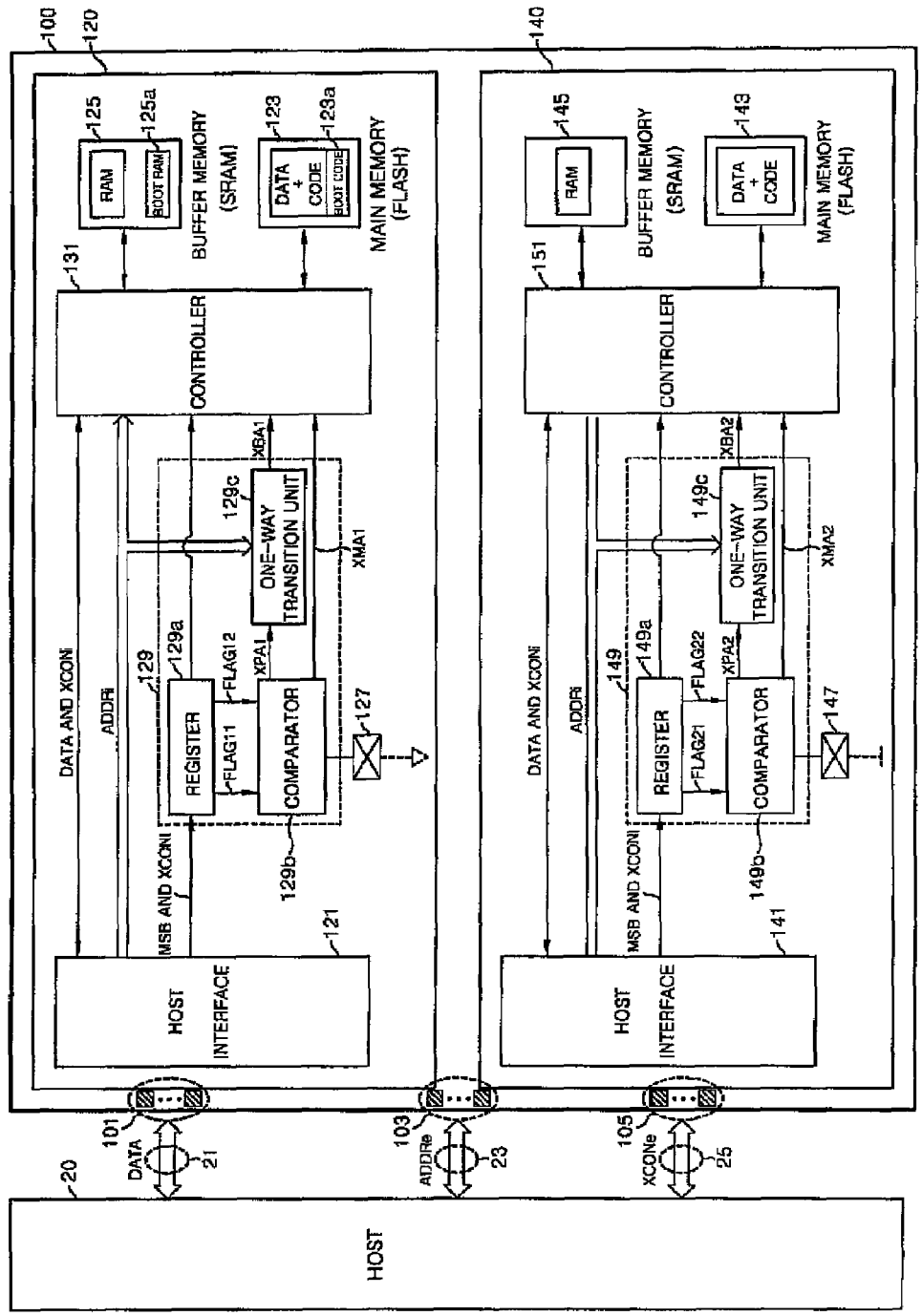
FIG. 1 is a block diagram of a first embodiment of a multi-chip package device.

Reference now should be made to the drawings, in which the same reference numerals are used throughout the different drawings to designate the same or similar components.

FIG. 1 is a block diagram of a multi-chip package device 100. Referring to FIG. 1, the multi-chip package device 100 includes first and second memory chips 120 and 140 mounted in a single package or housing. A unified memory technology of storing code and data in a single piece of memory is applied to the first and second memory chips 120 and 140. The multi-chip package device 100 stores data provided from a host 20, or outputs data requested by the host 20. The first and second memory chips 120 and 140 of the multi-chip package device 100 are designed to have a similar configuration.

The multi-chip package device 100 exchanges data with the host 20 via one or more data transmission lines 21. The multi-chip package device 100 receives external addresses ADDRe and external control signals XCONe from the host 20 via one or more address lines 23 and one or more control lines 25, respectively. Furthermore, the multi-chip package device 100 includes data pins 101, address pins 103 and control pins 105 that are shared by the first and second memory chips 120 and 140. That is, the data, the external addresses ADDRe and the external control signals XCONe provided from the host 20 to the multi-chip package device 100 are fed to the first and second memory chips 120 and 140 at the same time. The external control signals XCONe include a chip enable signal /CE indicating the enabling of the multi-chip package device, an effective address signal /AVD indicating that an external address can be effectively input, a write enable signal /WE indicating a write access operation, an output enable signal /OE indicating a data output operation, and an operation indication signal BUSY indicating that the multi-chip package device is being accessed.

The first and second memory chips 120 and 140 included in the single package can be distinguished as a memory chip having a lower address and a memory chip having an upper address depending on option voltages provided to option terminals 127 and 147 of first and second memory chips 120, 140 respectively. The option voltages may be provided to option terminals 127 and 147 via option voltage terminals of a chip carrier of housing of the package device 100. For example, consider the case where the option voltage of the first memory chip 120 is at a ground voltage level, VSS, that is, a data value of logic "L", and the option voltage of the second memory chip 140 is at a power supply voltage level, that is, a data value of logic "H". In this case, when the MSB (most significant bit) in input external addresses and/or external control signals, for example, an external address ADDRe, is the same as the data value of the option voltage of the first memory chip 120 (e.g., is a logic "L"), then the first memory chip 120 can be assessed using an internal address ADDRi composed of the remaining address bits other than the MSB. In contrast, when the MSB address is the same as the data value of the option voltage of the second memory chip 140 (e.g., is a logic "H"), then the second memory chip 140 can be assessed using the internal address ADDRi.

The first and second memory chips 120 and 140 each include, respectively, a host interface 121 or 141, a main memory 123 or 143, a buffer memory 125 or 145, an option terminal 127 or 147, an access signal generation block 129 or 149, and a controller 131 or 151. The host interfaces 121 and 141 function as interfaces, and can be implemented to employ one of various interface methods. For example, the host interfaces 121 and 141 may be implemented to employ a Static Random Access Memory (SRAM) interface method. Alternatively, the host interfaces 121 and 141 may be implemented to employ the interface method of a NOR flash memory similar to the SRAM interface method.

In the present specification and the attached claims, addresses and control signals provided from the host 20 to the host interfaces 121 and 141 are referred to as 'external addresses ADDRe' and 'external control signals XCONe', respectively, and addresses and control signals transmitted to the interiors of the memory chips 120 and 140 through the host interfaces 121 and 141 are referred to as 'internal addresses ADDRi' and 'internal control signals XCONi', respectively. Meanwhile, the internal addresses ADDRi and the internal control signals XCONi are ultimately controlled by the external addresses ADDRe and the external control signals XCONe. Accordingly, in the specification and the attached claims, if there is no need to distinguish the internal addresses ADDRi from the external addresses ADDRe, they may be referred to as 'addresses ADDR' for convenience of description. Additionally, there is no need to distinguish the 'internal control signals XCONi' from the 'external control signals', they may be referred to as 'control signals XCON'.

The main memory 123 and 143 is memory that stores both code and data, and is beneficially implemented in the form of NAND flash memory. To store data in the main memory 123 and 143, data to be stored are transmitted from the host 20 to the multi-chip package device 100. The selected memory chip of the multi-chip package device 100 temporarily stores the data, which are transmitted from the host 20, in the buffer memory 125 or 145. Thereafter, in the selected memory chip, the data stored in the buffer memory 125 or 145 are internally read under the control of the controller 131 or 151, and the read data are stored in the main memory 123 or 143 under the control of the controller 131 or 151.

The case where data stored in the main memory 123 or 143 are transmitted to the host 20 is described below. The data stored in the main memory 123 or 143 are read under the control of the controller 131 or 151, and the read data are temporarily stored in the buffer memory 125 or 145. Thereafter, when a request is made by the host 20, the data stored in the buffer memory 125 or 145 are internally read under the control of the controller 131 and 151, and the read data are transmitted to the host 20. In the case of using the buffer memory 125 and 145 as described above, the overall performance of data write and read operations of the multi-chip package device 100 is improved.

In the meantime, boot code 123a including a program that allows a priority processing command to be executed is stored in the main memory 123 of the first memory chip 120. When a priority processing command is issued, the address ADDR corresponds to a certain boot code address. The buffer memory 125 of the first memory chip 120 includes a boot memory (e.g., boot RAM 125a) that temporarily stores the boot code 123a. The boot RAM 125a is specified in response to a boot code address ADDR.

An example of the priority processing command is described below. The case where the multi-chip package device is applied to a mobile phone is taken as an example. In this case, while a game is being played on the mobile phone, an exceptional operation mode, such as a telephone call, may occur. At this time, prior to the issuance of a command to access the game that is being performed, a program relating to the telephone call is booted. In the present specification and the attached claims, a command that is required to be performed prior to the performance of a general operation is referred to as a 'priority processing command'.

In the present embodiment, it is preferred that the buffer memory 125 and 145 is implemented in the form of SRAM. Furthermore, it is apparent to those skilled in the art that the buffer memory 125 and 145 can be implemented using other memory, including other RAM. In this case, the interface method of the host interfaces 121 and 141 is determined depending on the interface method of the memory that is adopted as the buffer memory 125 and 145.

The access signal generation blocks 129 and 149 generate main access signals XMA1 and XMA2 and buffer access signals XBA1 and XBA2. The main access signals XMA1 and XMA2 drive access to the main memory 123 and 143. The buffer access signals XBA1 and XBA2 drive access to the buffer memory 125 and 145. The main access signals XMA1 and XMA2 and the buffer access signals XBA1 and XBA2 respond to address bits (for example, the MSB of the address) and control signals XCON, which are provided from the host 20, via the host interfaces 121 and 141.

The logic states of the main access signals XMA1 and XMA2 and the buffer access signals XBA1 and XBA2 are determined depending on the levels of the option voltages of the memory chips 120 and 140 in which the signals are included. At this time, the buffer access signals XBA1 and XBA2 undergo a one-way transition in response to ADDR corresponding to a boot code address. In the present embodiment, the main access signals XMA1 and XMA2 and the buffer access signals XBA1 and XBA2 are activated when they are in a logic "H" state.

Preferably, the access signal generation blocks 129 and 149 each include a register 129a or 149a, a comparator 129b and 149b, and a one-way transition unit 129c or 149c. The registers 129a and 149a each generate respective first flag signals FLAG11 and FLAG21 and respective second flag signals FLAG12 and FLAG22 whose logic states are controlled according to the address ADDR and the control signals XCON. The first flag signals FLAG11 and FLAG21 indicate the selection of corresponding main memory 123 and 143 while the second flag signals FLAG12 and FLAG22 indicate the selection of the buffer memory 125 and 145.

During the operation of the multi-chip package device 100 in the timing interval in which a memory chip to be accessed is selected, the first flag signal FLAG11 of the first memory chip 120 and the first flag signal FLAG21 of the second memory chip 140 are maintained in the same logic state, and the second flag signal FLAG12 of the first memory chip 120 and the second flag signal FLAG22 of the second memory chip 140 are also maintained in the same logic state.

The comparators 129b and 149b compare the first flag signals FLAG11 and FLAG21 and the second flag signals FLAG12 and FLAG22 with option voltages provided to the option terminals 127 and 147, and generate main access signals XMA1 and XMA2 and preparatory access signals XPA1 and XPA2. The option voltage of the first memory chip 120 and the option voltage of the second memory chip 140 are different from each other—more specifically, they have the voltage levels of opposite logic states.

As a result, the activation of the main access signal XMA1 of the first memory chip 120 does not overlap in time the activation of the main access signal XMA2 of the second memory chip 140. Additionally, the activation of the buffer access signal XBA1 of the first memory chip 120 does not overlap in time the activation of the buffer access signal XBA2 of the second memory chip 140.

Figure 2A:
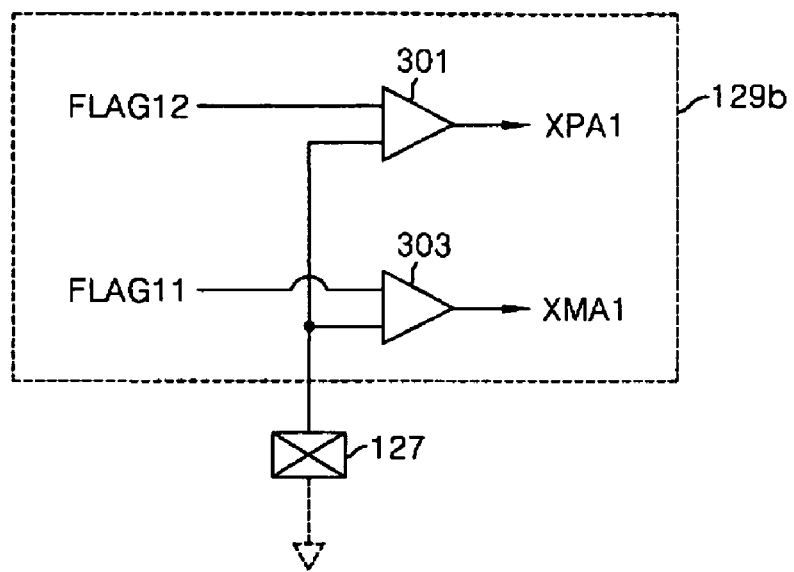
FIGS. 2a and 2b are diagrams showing the comparators of the first and second memory chips of FIG. 1 in detail.
Figure 2B:
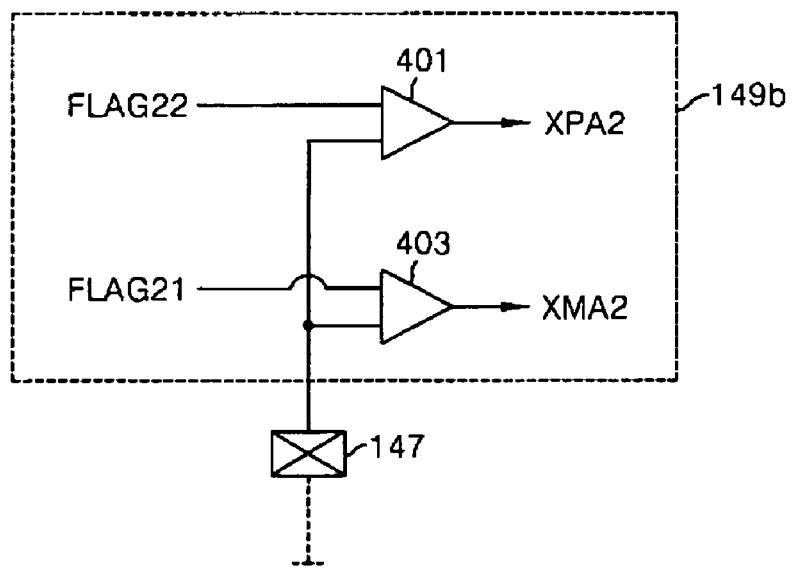

Next, the operation of the comparators 129b and 149b is described in detail below. FIGS. 2a and 2b are diagrams showing the construction of one embodiment of the comparators 129b and 149b of the first and second memory chips 120 and 140 in detail, respectively. The comparators 129b and 149b each include two comparison circuits 301 and 303, or 401 and 403. In the present embodiment, the comparison circuits 301 and 303, or 401 and 403 each generate an output signal, which is activated to a logic "H" level when both of the received signals are in the same logic state.

Now, assume that the ground voltage VSS is applied to the option terminal 127 of the first memory chip 120. Accordingly, in the case of the first memory chip 120, the main access signal XMA1 is activated to logic "H" when the first flag signal FLAG11 is in the logic "L" state, and the preparatory access signal XPA1 is activated to the logic "H" state, when the second flag signal FLAG12 is in the logic "L" state.

Likewise, assume that the power source voltage VCC is applied to the option terminal 147 of the second memory chip 140. Accordingly, in the case of the second memory chip 140, the main access signal XMA2 is activated to logic "H" when the first flag signal FLAG21 is in the logic "H" state, and the preparatory access signal XPA2 is activated to the logic "H" state, when the second flag signal FLAG22 is in the logic "H" state.

As a result, in the multi-chip package device 100 even though the same external control signals XCONe are provided from the host 20, memory chips to be selected are determined depending on applied option voltages.

Referring to FIG. 1 again, the one-way transition units 129c and 149c respond to the boot code address, and generate the buffer access signals XBA1 and XBA2 by effecting the one-way transition of the preparatory access signals XPA1 and XPA2. It is apparent to those skilled in the art that, if the boot code address can be distinguished using only specific addresses, then the one-way transition units 129c and 149c can be implemented using circuits that respond only to those specific addresses.

Figure 3A:
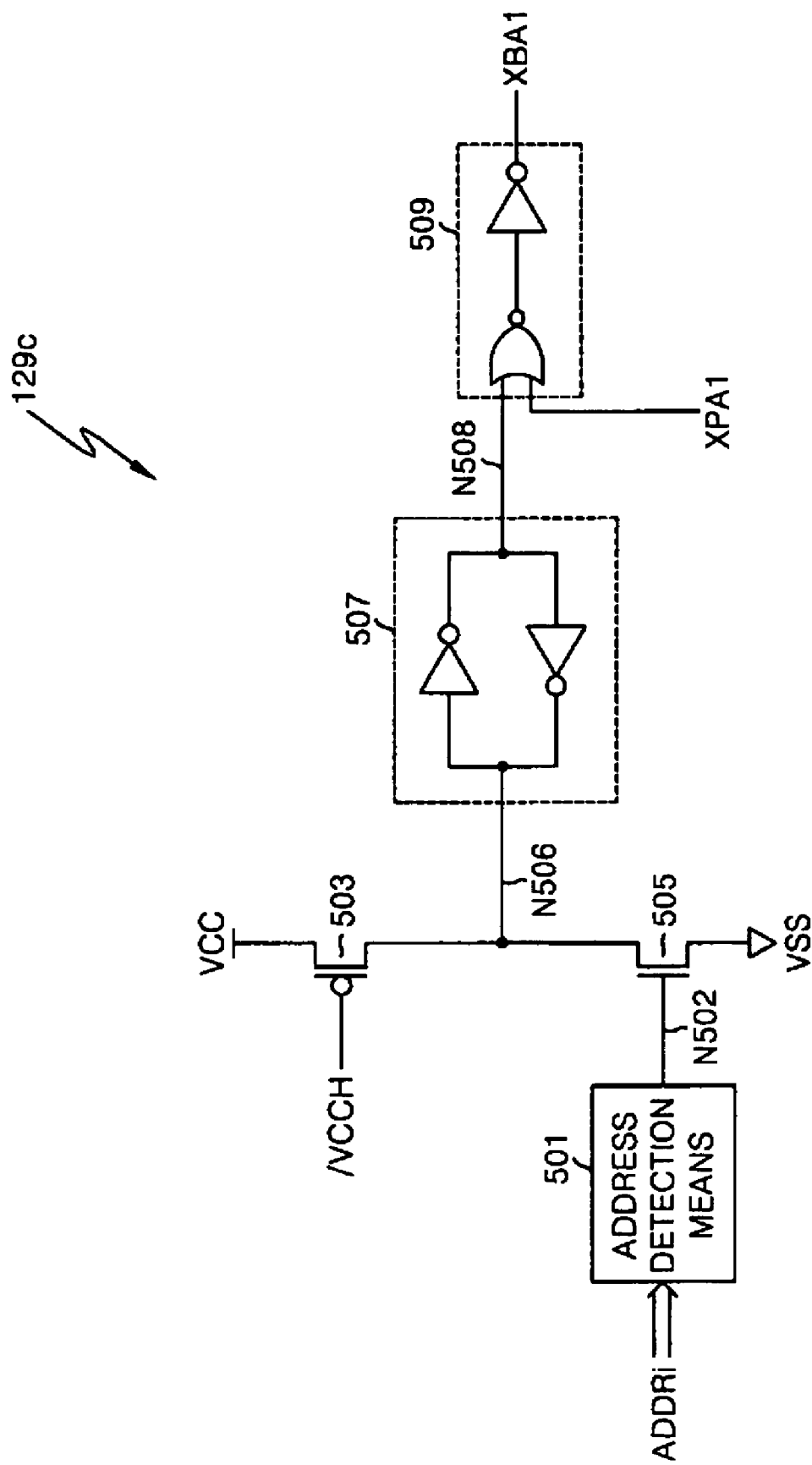
FIG. 3a is a diagram showing the one-way transition unit of the first memory chip of FIG. 1 in more detail.

FIG. 3a is a diagram showing an embodiment of the one-way transition unit 129c of the first memory chip 120 of FIG. 1 in more detail. Referring to FIG. 3a, the one-way transition unit 129c includes an address detection means 501, a P-channel Metal Oxide Semiconductor (PMOS) transistor 503, an N-channel Metal Oxide semiconductor (NMOS) transistor 505, an inverting latch 507 and a logical sum means 509.

The address detection means 501 monitors addresses ADDR to detect a boot code address. When an address ADDR corresponding to a boot code address is generated, the output signal N502 of the address detection means 501 is activated to logic "H."

The PMOS transistor 503 is gated by a power-up signal /VCCH that is generated in the form of a logic "L" pulse at an early stage of power-up, and the NMOS transistor 505 is gated by the output signal N502 of the address detection means 501.

The inverting latch 507 latches the signal of a common connection terminal N506, to which the drain terminals of the PMOS and NMOS transistors 503 and 505 are connected in common, while inverting the signal, and outputs the signal.

The logical sum means 509 performs an OR operation on the output signal N508 of the inverting latch 507 and the preparatory access signal XPA1, and outputs the buffer access signal XBA1.

Figure 3B:
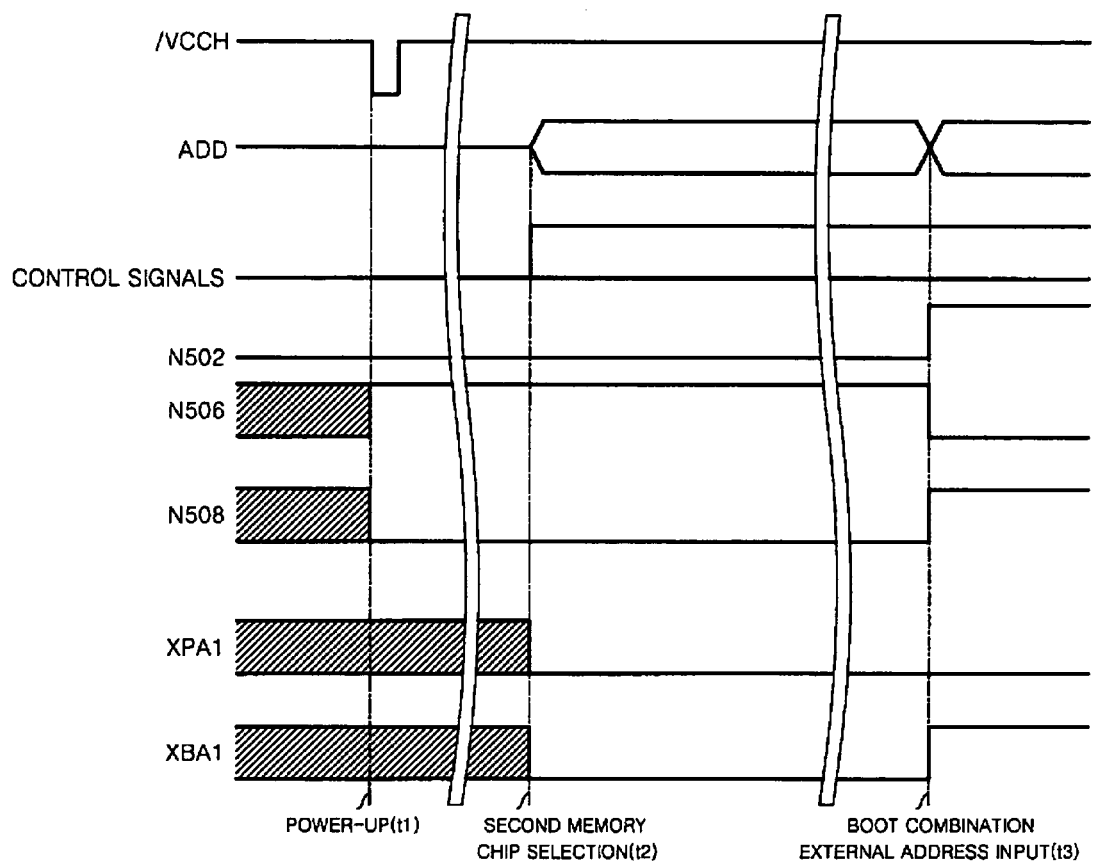
FIG. 3b is a timing diagram showing the principal terminals of the one-way transition unit of FIG. 3a, which shows the case where the addresses of a boot combination are generated during access to the second memory chip.

FIG. 3b is a timing diagram showing the principal terminals of the one-way transition unit 129c of FIG. 3a, which shows the case where a boot code address is generated during access to the second memory chip 140.

When the power-up signal /VCCH is generated in the form of a logic "L" pulse at power-up time point t1, the common connection terminal N506 of the PMOS transistor 503 and the NMOS transistor 505 is set to logic "H" and the output signal N508 of the inverting latch 507 is set to logic "L."

At time point t2, the second memory chip 140 is enabled by the MSB of the address and the control signals XCON. At the same time, the preparatory access signal XPA1 of the first memory chip 120 is set to logic "L" and, accordingly, the buffer access signal XBA1 of the first memory chip 120 is set to logic "L."

When a priority processing command is issued, that is, an address ADDR is input corresponding to a boot code address, at time point t3, the output signal N502 of the address detection means 501 is activated to logic "H." At this time, the common connection terminal N506 undergoes transition to logic "L" and the output signal N508 of the inverting latch 507 undergoes transition to logic "H."

The buffer access signal XBA1 of the first memory chip 120 is activated to and activation logic level (e.g., logic "H") in response to the transition of the output signal N508 of the inverting latch 507 to logic "H."

Figure 4A:
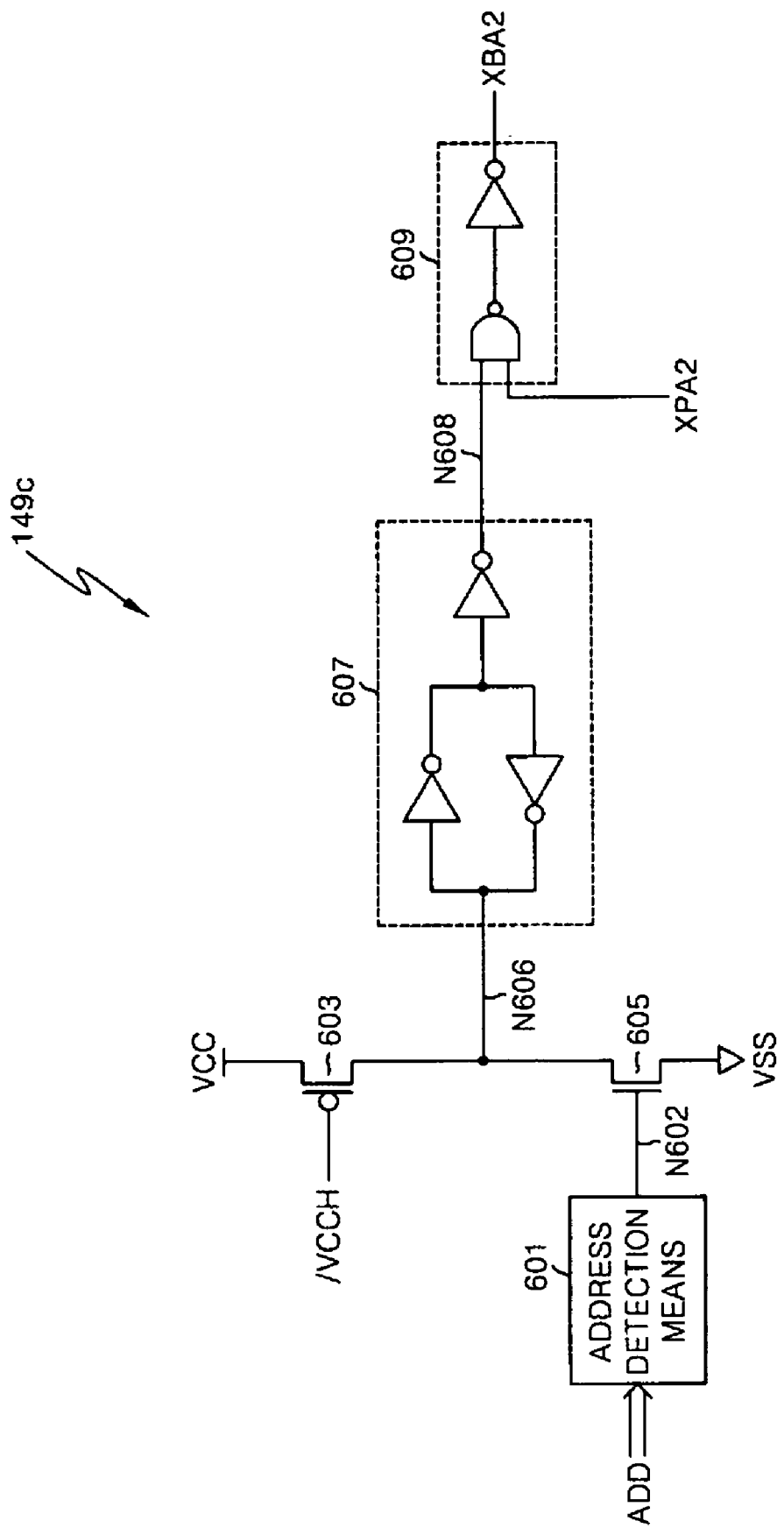
FIG. 4a is a diagram showing the one-way transition unit of the second memory chip of FIG. 1 in more detail.

FIG. 4a is a diagram showing the one-way transition unit 149c of the second memory chip 140 of FIG. 1 in more detail. Referring to FIG. 4, the one-way transition unit 149a includes an address detection means 601, a PMOS transistor 603, a NMOS transistor 605, a latch 607 and a logical product means 609.

Since the address detection means 601, PMOS transistor 603 and the NMOS transistor 605 of FIG. 4a have the same construction and operation as the address detection means 501, the PMOS transistor 503 and the NMOS transistor 505 of FIG. 3a, respectively, detailed descriptions thereof are omitted in the present specification.

The latch 607 latches and outputs the signal of a common connection terminal N606 to which the drain terminals of the PMOS transistor 603 and the NMOS transistor 605 are connected in common.

The logical product means 609 performs an AND operation on the output signal N608 of the latch 607 and the preparatory signal XPA2 and outputs the buffer access signal XBA2.

Figure 4B:
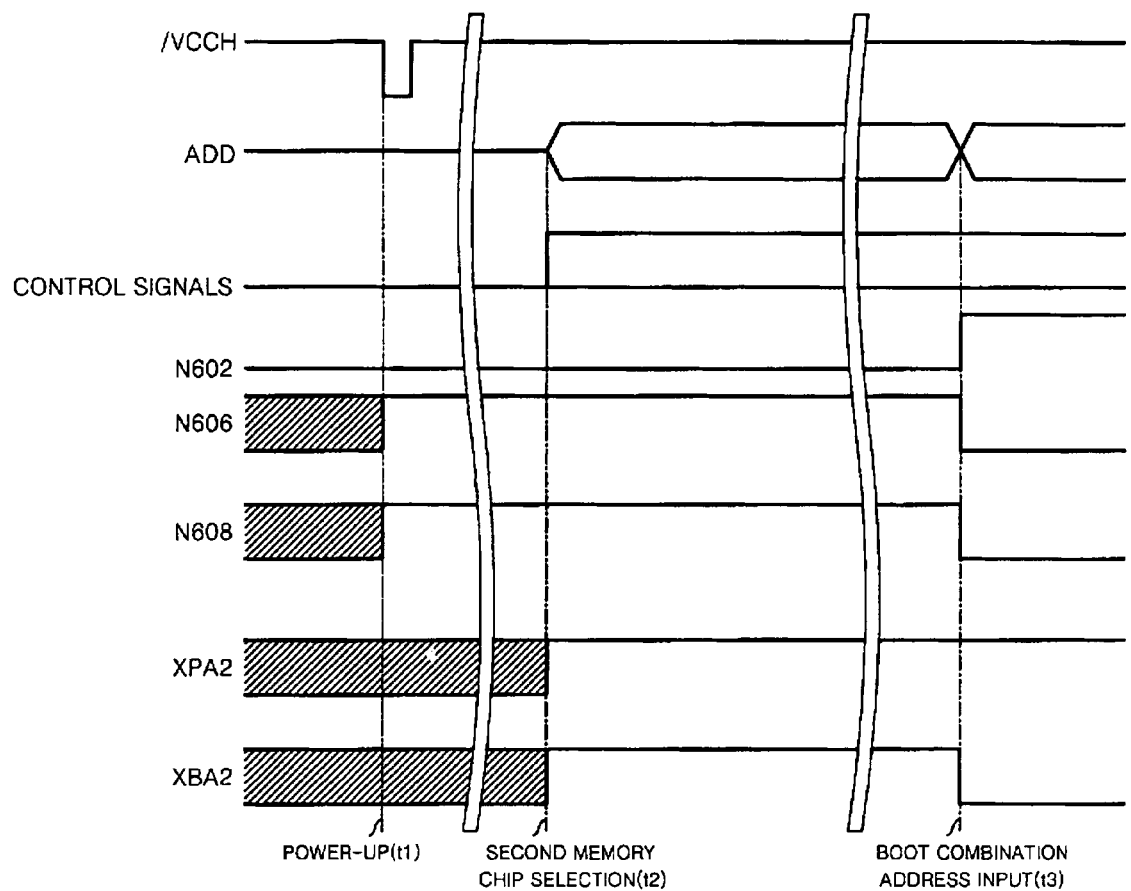
FIG. 4b is a timing diagram showing the principal terminals of the one-way transition unit of FIG. 4a, which shows a case where a boot code address is generated during access to the second memory chip.

FIG. 4b is a timing diagram showing the principal terminals of the one-way transition unit 149c of FIG. 4a, which shows the case where an address ADDR corresponding to a boot code address is generated during access to the second memory chip 140.

When the power-up signal /VCCH is generated in the form of an "L" pulse at power-up time point t1, the common connection terminal N606 of the PMOS transistor 603 and the NMOS transistor 605 is set to logic "H" and the output signal N608 of the latch 607 is set to logic "L."

At time point t2, the second memory chip 140 is enabled by the MSB of the address and the control signals XCON. At this time, the preparatory access signal XPA2 of the second memory chip 140 is set to logic "H" and, accordingly, the buffer access signal XBA2 of the second memory chip 140 is set to an activation logic level (e.g., logic "H").

When a priority processing command is issued, that is, an address ADDR corresponding to a boot code address is input, at time point t3, the output signal N602 of the address detection means 601 is activated to logic "H." At this time, the common connection terminal N606 undergoes transition to logic "L" and the output signal N608 of the latch 607 undergoes transition to logic "L."

The buffer access signal XBA2 of the second memory chip 140 is deactivated to a deactivation logic level (e.g., logic "L") in response to the transition of the output signal N608 of the latch 607 to logic "L."

Referring to FIG. 1 again, the controllers 131 and 151 operate to select the main memory 123 and 143 in response to the main access signals XMA1 and XMA2. The controllers 131 and 151 operate to access the main memory 123 and 143 according to the internal control signals XCONi and the main access signals XMA1 and XMA2 provided from the registers 129a and 149a. The controllers 131 and 151 operate to select the buffer memory 125 and 145 in response to the buffer access signals XBA1 and XBA2. Furthermore, the controllers 131 and 151 operate to access the buffer memory 125 and 145 according to the internal control signals XCONi and the buffer access signals XBA1 and XBA2 provided from the registers 129a and 149a.

Next, the case where a priority processing command is issued during access to the second memory chip 140, in which boot code is not included, in the multi-chip package device 100 is described below.

Figure 5:
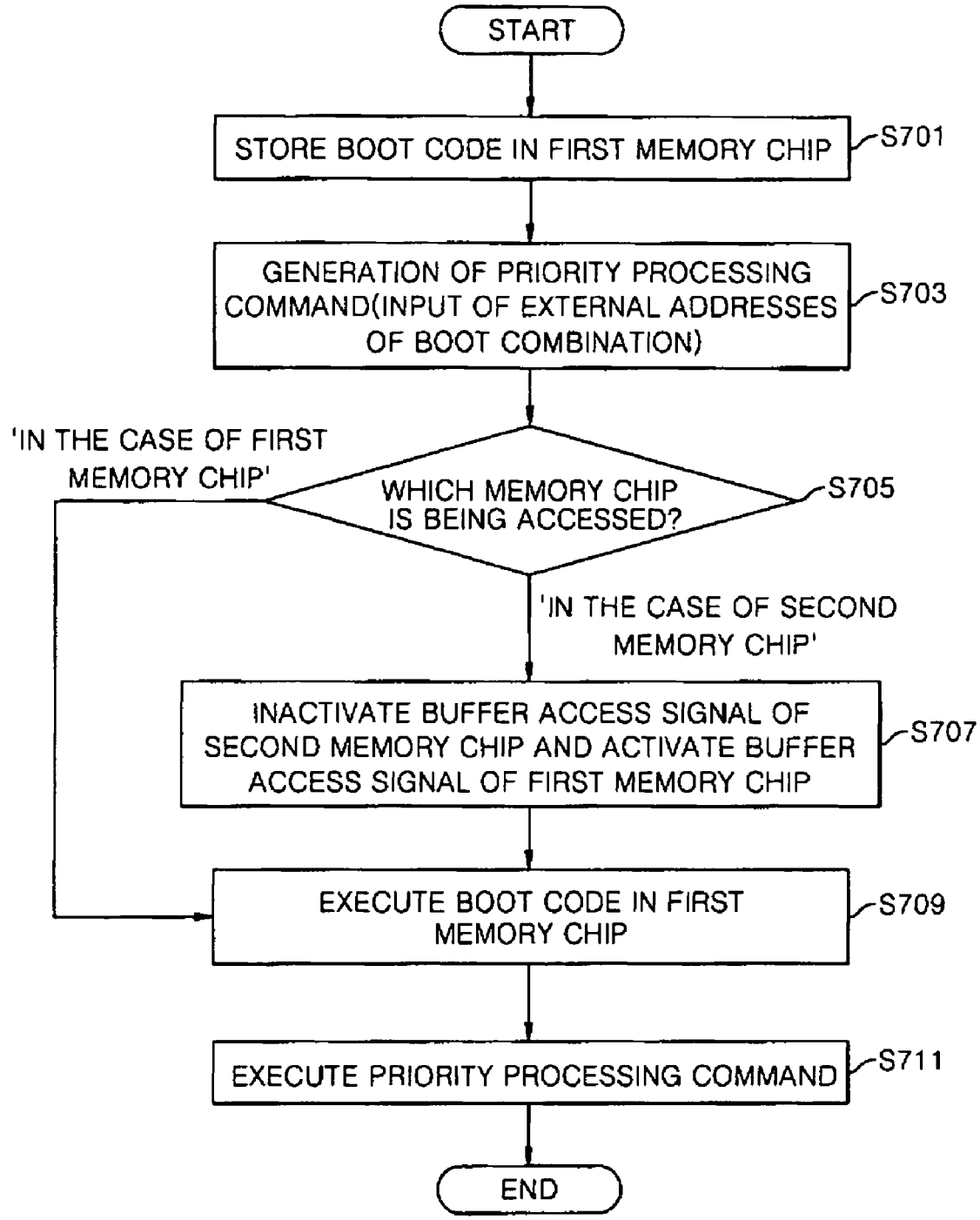
FIG. 5 is a flowchart showing a method of driving the multi-chip package device which shows the case where a priority processing command is issued.

FIG. 5 is a flowchart showing a method of driving the multi-chip package device 100 which shows the case where a priority processing command is issued.

Before a user uses the multi-chip package device 100 the boot code is stored in the main memory 123 of the first memory chip 120. The boot code is temporarily stored in the buffer memory 125 of the first memory chip 120 at step S701. At this time, it is the same as described above that the buffer memory 125 of the first memory chip 120 is accessed in response to the activation of the buffer access signal XBA1 (in the present specification and the attached claims, referred to as a "first buffer access signal") of the first memory chip 120.

Next, in step S703, the priority processing command is issued. That is, an external ADDRe address corresponding to a boot code address is input during access to the multi-chip package device 100.

Then, at step S705, it is determined which memory chip is being accessed.

If, as a result of the determination at step S705, it is determined that the second memory chip 140 is being accessed, then it is the case where the priority processing command is received while the buffer access signal XBA2 (in the present specification and the attached claims, referred to as a "second buffer access signal") that performs control to access the buffer memory 145 of the second memory chip 140 is activated.

In that case, in a step S707 in response to the priority processing command (that is, the addresses ADDR of the boot code address combination), the buffer access signal XBA2 of the second memory chip 140 is deactivated, and the buffer access signal XBA1 of the first memory chip 120 is activated.

Furthermore, the boot code of the first memory chip 120 is executed at step S709, and, therefore, the priority processing command is executed at step S711.

On the other hand, if, as a result of the determination at step S705, it is determined that the first memory chip 120 is being accessed, then step S707 may be omitted and step S709 may be performed.

As described above, in accordance with the multi-chip package device of FIG. 1 and the method of driving the multi-chip package, although a priority processing command is issued during access to the second memory chip 140 in which boot code is not included, the boot code of the first memory chip 120 is efficiently accessed and executed. Accordingly, in such a case, an advantage arises in that the main memory 143 of the second memory chip 140 can expand a space capable of storing data and use the expanded space.

Figure 6:
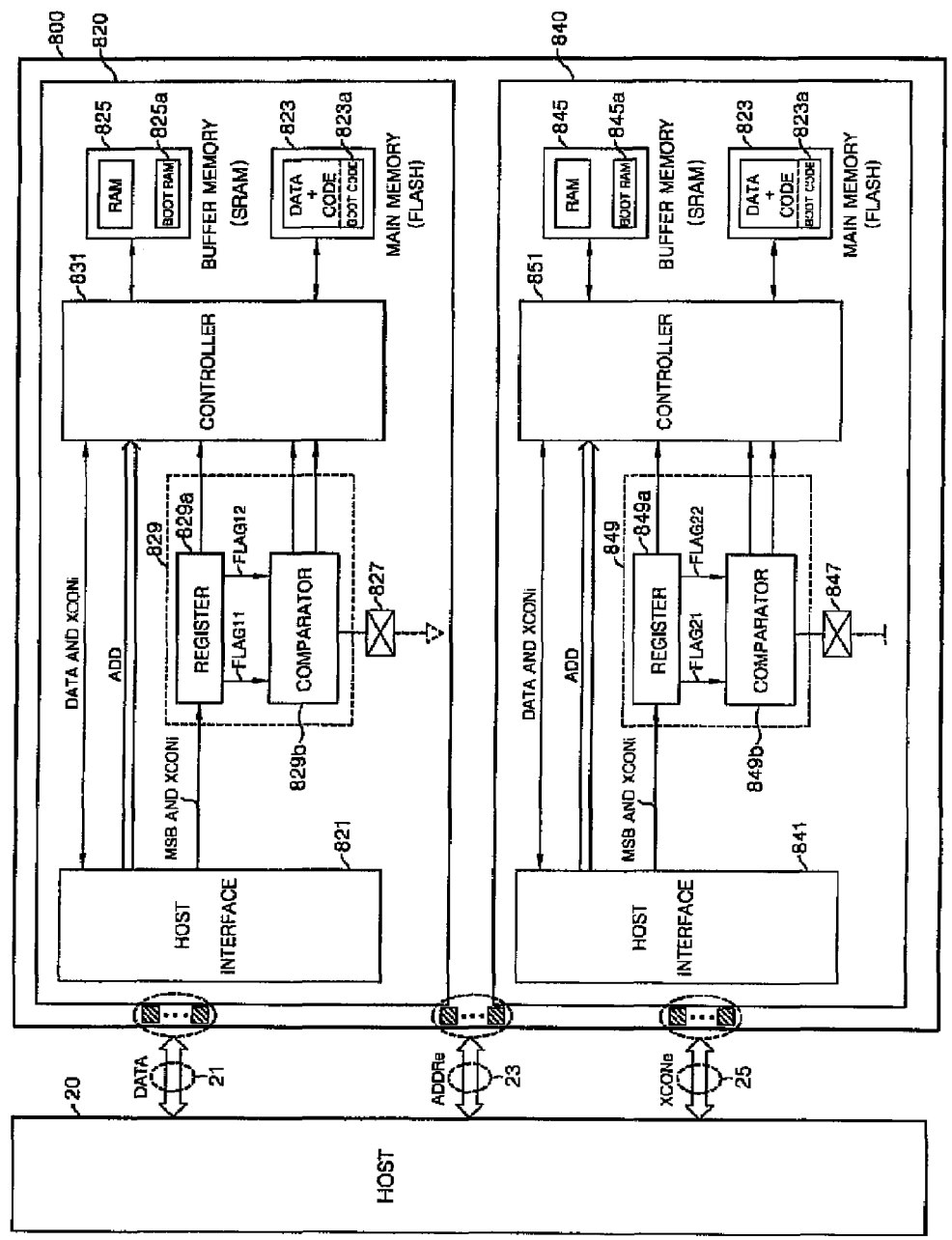
FIG. 6 is a diagram of a second embodiment of a multi-chip package device.

FIG. 6 is a diagram of a multi-chip package device 800 according to another embodiment, which is a variant of the multi-chip package device 100 of FIG. 1. The multi-chip package device 800 of FIG. 6 includes first and second memory chips 820 and 840 to which a unified memory technology is applied, like the multi-chip package device of FIG. 1. The construction and operation of the first and second memory chips 820 and 840 of FIG. 6 are very similar to those of the first and second memory chips 120 and 140 of FIG. 1. Accordingly, in the present specification, the first and second memory chips 820 and 840 of FIG. 6 are described, with the difference between the embodiment of FIG. 6 and the embodiment of FIG. 1 being focused on.

In the embodiment of FIG. 6, boot code 823a and 843a is stored both in the main memory 823 of the first memory chip 820 and the main memory 843 of the second memory chip 840, unlike the embodiment of FIG. 1 in which the boot code is stored only in the main memory 123 of the first memory chip 120. Furthermore, not only the buffer memory 825 of the first memory chip 820 but also the buffer memory 845 of the second memory chip 840 include boot RAM memory (e.g., boot RAM) 825a and 845a.

In the embodiment of FIG. 6, when a priority processing command is issued during access to the first memory chip 820, the boot RAM 825a of the first memory chip 820 is accessed. When a priority processing command is issued during access to the second memory chip 840, the boot RAM 845a of the second memory chip 840 is accessed.

The embodiment of FIG. 6 is advantageous in that it is easy to implement the circuit because the embodiment does not require the one-way transition units 129c and 149c.

As described above, the multi-chip package device includes two or more memory chips to which a unified memory technology is applied. Furthermore, the boot code capable of executing a priority processing command may be accessed by the one-way transition units, or is stored in memory chips. As a result, in accordance with the multi-chip package device and the method of driving the multi-chip package device, the boot code can be efficiently stored and effectively accessed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multi-chip package device, comprising:
   first and second memory chips configured to share addresses and control signals, wherein each of the first and second memory chips comprises:
   main memory for storing data,
   buffer memory for temporarily storing data written to and read from the main memory,
   an option terminal for receiving an option voltage,
   an access signal generation block for generating a main access signal driving access to the main memory and a buffer access signal driving access to the buffer memory in response to the addresses and the control signals, the main access signal and the buffer access signal having logic states that are determined according to a level of the option voltage, the buffer access signal undergoing a one-way transition in response to a boot code address when a predetermined internal address composed of remaining address bits except a most significant bit of a shared address specifies the boot code address, and
   a controller for performing control to select the main memory and the buffer memory in response to the main access signal and the buffer access signal;
   wherein the option voltages provided to the first and second memory chips have different voltage levels from each other;
   wherein the main memory of the first memory chip stores boot code that includes a program capable of performing an operation in conformity with a certain priority processing command;
   wherein the buffer memory of the first memory chip includes boot memory for temporarily storing the boot code, the boot memory being specified in response to the boot code address;
   wherein the main memory of the second memory chip does not store any boot code;
   wherein the buffer memory of the second memory chip does not include any boot memory; and
   wherein the one-way transition of the buffer access signal of the first memory chip is a transition to an activation level, and the one-way transition of the buffer access signal of the second memory chip is a transition to an inactivation level.

2. The multi-chip package device of claim 1, wherein the access signal generation block comprises:
   a register for generating first and second flag signals whose logic states are controlled according to the control signals, the first flag signal indicating selection of a corresponding main memory, the second flag signal indicating selection of a corresponding buffer memory;

a comparator for generating the main access signal and a preparatory access signal by comparing the first and second flag signals with the option voltages; and a one-way transition unit for generating the buffer access signal by effecting transition of the preparatory access signal in response to the boot code address.

3. The multi-chip package device of claim 1, wherein the main memory is a NAND flash memory, and the buffer memory is Static RAM (SRAM).

4. The multi-chip package device of claim 1, wherein activation of the main access signal of the first memory chip temporally does not overlap activation of the main access signal of the second memory chip.

5. The multi-chip package device of claim 1, wherein activation of the buffer access signal of the first memory chip temporally does not overlap activation of the buffer access signal of the second memory chip.

6. The multi-chip package device of claim 1, wherein the main memory of the first and second memory chips stores program code.

7. A method of driving a multi-chip package device having first and second memory chips configured to share addresses and control signals, comprising the steps of:

storing boot code, including a program capable of performing an operation in conformity with a priority processing command, in buffer memory of the first memory chip before a user uses the multi-chip package device, the buffer memory of the first memory chip storing accessed boot code in response to activation of a predetermined first buffer access signal;

receiving the priority processing command, including a boot code address when a predetermined internal address composed of remaining address bits except a most significant bit of a shared address specifies the boot code address, in an activation state of a second buffer access signal that performs control to perform access to the buffer memory of the second memory chip, wherein the second memory chip does not store any boot code;

deactivating the second buffer access signal and activating the first buffer access signal in response to the priority processing command; and executing the boot code in response to the activation of the first buffer access signal.

8. The method of claim 7, further comprising executing the priority processing command.

9. A multi-chip package device, comprising:

a semiconductor device package;

first and second memory chips, configured to share addresses and control signals, and mounted in the semiconductor device package, the first memory chip including, main memory for storing data and boot code that includes a program capable of performing an operation in conformity with a priority processing command, buffer memory for temporarily storing data written to and read from the main memory, the buffer memory including boot memory for temporarily storing the boot code, the boot memory being specified in response to a boot code address when a particular internal address composed of remaining address bits except a most significant bit of a shared address specifies the boot code address, an option terminal for receiving a first option voltage, and means for enabling access to the boot memory in response to receiving the boot code address; and the second memory chip including, main memory for storing data and not storing any boot code buffer memory for temporarily storing data written to and read from the main memory, said buffer memory not including any boot memory, and an option terminal for receiving a second option voltage, and wherein the option voltages provided to the first and second memory chips have different voltage levels from each other.

10. The multi-chip package device of claim 9, wherein the second memory chip includes means for temporarily disabling access to the buffer memory of the second memory chip in response to receiving the boot code address.

11. The multi-chip package device of claim 10, wherein the means for temporarily disabling access to the buffer memory of the second memory chip in response to receiving the boot code address comprises:

an address decoder for decoding the boot code address; and a logic circuit for logically combining an output of the address decoder and the second option voltage level to produce a signal disabling access to the buffer memory of the second memory chip when the address decoder decodes the boot code address.

12. The multi-chip package device of claim 9, wherein the means for enabling access to the boot memory in response to receiving the boot code address comprises:

an address decoder for decoding the boot code address; and a logic circuit for logically combining an output of the address decoder and the first option voltage level to produce a signal enabling access to the buffer memory of the first memory chip when the address decoder decodes the boot code address.

* * * * *